Patented Mar. 22, 1927.

1,622,233

UNITED STATES PATENT OFFICE.

GEORGE CALINGAERT, OF CAMBRIDGE, MASSACHUSETTS, ASSIGNOR, BY MESNE ASSIGNMENTS, TO GENERAL MOTORS CORPORATION, OF DETROIT, MICHIGAN, A CORPORATION OF DELAWARE.

PROCESS OF PRODUCING ALKYL COMPOUND OF LEAD.

No Drawing. Application filed January 17, 1924, Serial No. 686,924. Renewed November 7, 1925.

This invention relates to modes of producing lead alkyls and its principal object is to reduce the cost of manufacture especially by making the several reactions occurring, proceed at about the same rate.

By way of example, in the production of tetra ethyl lead, I may use, by weight, 50 parts of a lead sodium alloy containing about 18% sodium ($PbNa_2$), 64 parts of ethyl iodide, 2 parts of pyridine and 4 parts of water which is less than 7 parts or the theoretical amount of water as based on the sodium. The 4 parts of water employed is in about the ratio of 6:10 to the sodium present. The alloy, ethyl iodide and pyridine are placed in a reflux apparatus provided with a water bath and an agitator. The temperature of the mix is maintained at just below the boiling point of the alkyl halide (here ethyl iodide whose boiling point is about 72° C.) the mix is stirred and the water is added slowly and preferably over a period of two hours or more.

Apparently the sodium reacts with the water forming nascent hydrogen which has a reducing action on the rest of the mix, forming di-ethyl lead and hydrogen iodide. The di-ethyl lead decomposes thermally into tetra ethyl lead and elemental lead, the hydrogen unites with the iodine forming hydrogen iodide, and the reaction between the sodium and water yields sodium hydroxide. Water is regenerated by the reaction of the hydrogen iodide with sodium hydroxide and this regenerated water reacts with sodium in the alloy forming again nascent hydrogen and sodium hydroxide. When the reaction is completed the tetra ethyl lead is steam distilled out and collected in another container.

The process may be varied by using other alkyl halides to produce other lead alkyls or to produce tetra ethyl lead. Ethyl bromide may be used to form tetra ethyl lead and methyl bromide or iodide may be used to form tetra methyl lead. The quantity of sodium in the alloy may be varied but is preferably substantially the theoretical amount necessary to form the di-ethyl lead. I have successfully employed from 33% of the theoretical amount of water to the theoretical amount.

By employing less than the theoretical amount of water, the rate of production of nascent hydrogen is reduced to more nearly the rate at which this hydrogen is used for reduction, and loss due to formation of atomic hydrogen is minimized.

Water is one of a number of substances which react with metals to liberate nascent hydrogen. The reaction progresses most favorably in the absence of an acid condition and the presence of the alkali prevents acidity.

What I claim is as follows:

1. A process of producing lead alkyl which comprises mixing lead, an alkyl halide, and a metal and a substance adapted to react with this metal to liberate nascent hydrogen, the substance being added slowly at a rate less than that at which the hydrogen liberated is used.

2. The process of producing a lead alkyl which comprises mixing lead, sodium and an alkyl halide; adding water at a rate less than that at which the hydrogen liberated is used; and regenerating water which reacts with the sodium to liberate more hydrogen.

3. The process of producing tetra ethyl lead which comprises mixing lead, sodium and an ethyl halide; adding water at a rate less than that at which the hydrogen liberater is used, the amount of water added being at least 33% of the theortical amount; and regenerating water which reacts with the sodium to liberate hydrogen.

In testimony whereof I hereto affix my signature.

GEORGE CALINGAERT.